(12) United States Patent
Juntunen et al.

(10) Patent No.: US 6,647,018 B1
(45) Date of Patent: Nov. 11, 2003

(54) METHOD FOR IMPLEMENTING ISDN USER PORT STATUS MONITORING

(75) Inventors: Timo Juntunen, Oulu (FI); Toivo Lallukka, Oulu (FI); Tiina Lehikoinen, Oulu (FI)

(73) Assignee: Nokia Corporation, Espoo (FI)

( * ) Notice: Subject to any disclaimer, the term of this patent is extended or adjusted under 35 U.S.C. 154(b) by 619 days.

(21) Appl. No.: 09/591,907

(22) Filed: Jun. 12, 2000

Related U.S. Application Data

(63) Continuation of application No. PCT/FI98/00992, filed on Dec. 17, 1998.

(30) Foreign Application Priority Data

Dec. 17, 1997 (FI) .................................................. 974545

(51) Int. Cl.[7] .......................... H04L 12/56; H04L 12/26
(52) U.S. Cl. ...................... 370/420; 370/252; 370/524
(58) Field of Search ................................. 370/420, 524, 370/252, 254; 379/93.32

(56) References Cited

U.S. PATENT DOCUMENTS 5,796,776 A 8/1998 Lomp et al.

FOREIGN PATENT DOCUMENTS

| DE | 19516516 A1 | 11/1996 | | |
|---|---|---|---|---|
| EP | 0730389 A2 | 9/1996 | | |
| EP | 0751692 | 1/1997 | | |
| EP | 0751692 A2 | 1/1997 | | |
| EP | 0792079 | * 8/1997 | ........... | H04Q/11/04 |
| WO | WO 97/35404 | * 9/1997 | ........... | H04L/12/24 |
| WO | WO 97/35443 | 9/1997 | | |
| WO | WO 98/08352 | 2/1998 | | |

OTHER PUBLICATIONS

K. Khakzar, *FREQUENZ*, "V5 Interfaces between Digital Local Exchanges and Access Networks", vol. 48, Jan. 1994, pp 44–50.
International Search report for PCT/FI98/00992.
"Signalling Protocols and Switching (SPS) V Interfaces at the Digital Local Exchange (LE), V5.2 interface for the support of Access Network (AN)", ETS 300 347–1.
"Signalling Protocols and Switching (SPS) V Interfaces at the Digital Local Exchange (LE), V5.1 Interface for the Support of Access Network (AN)", ETS 300–324–1.

* cited by examiner

Primary Examiner—Steven Nguyen
(74) Attorney, Agent, or Firm—Squire, Sanders & Dempsey L.L.P.

(57) ABSTRACT

The invention relates to a system and a method for implementing ISDN user port status monitoring in a network element transmitting messages in a cascaded V5 interface. In an embodiment of the invention, ISDN user port activation messages are transmitted unaltered through the message transmitting network element when the current state of the ports is other than the BLOCKED state consistent with the V5 definitions.

9 Claims, 1 Drawing Sheet

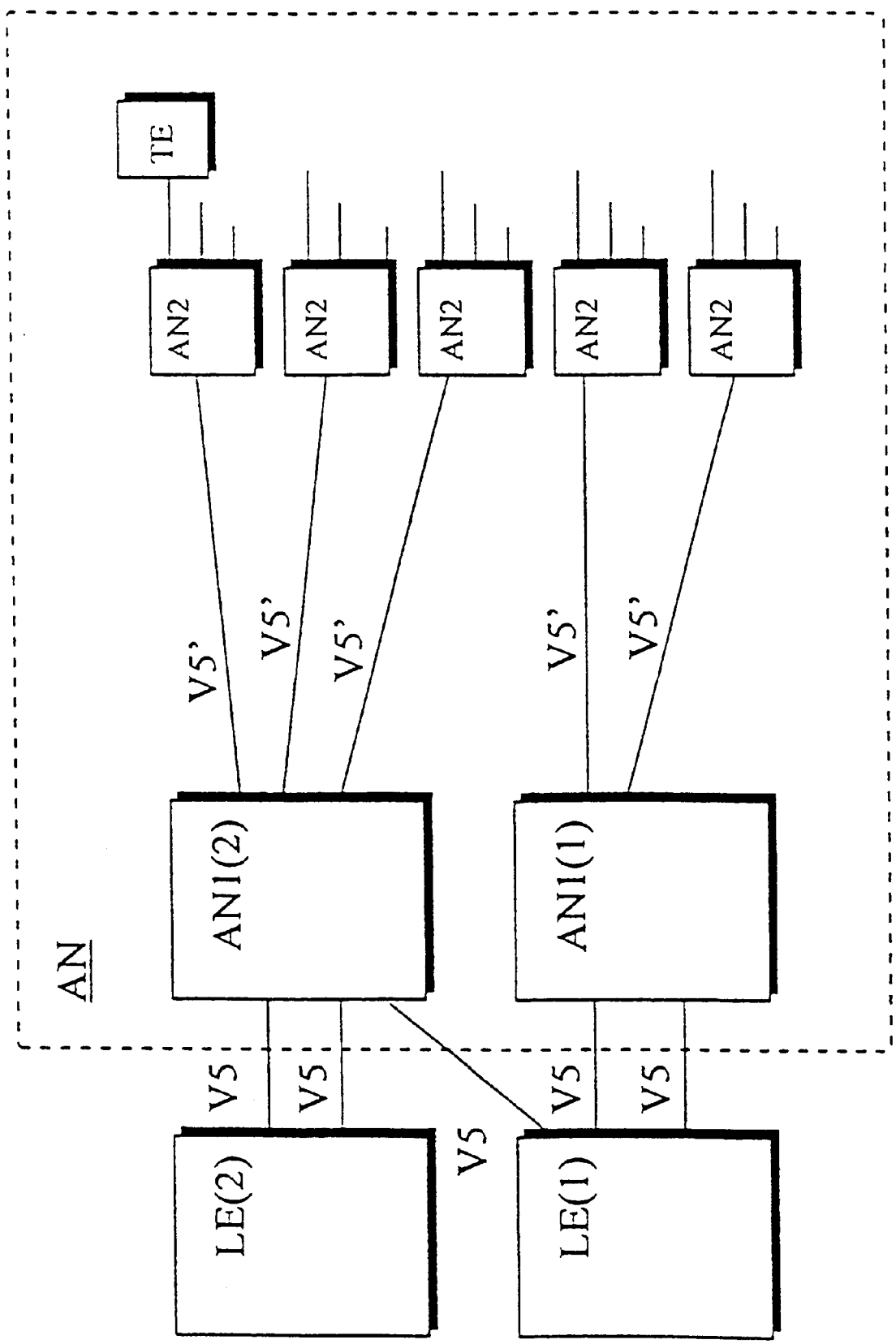

METHOD FOR IMPLEMENTING ISDN USER PORT STATUS MONITORING

This application is a continuation of international application serial number PCT/FI98/00992, filed Dec. 17, 1998.

BACKGROUND OF THE INVENTION

The present invention relates to a method for transmitting V5 protocols in a cascaded V5 interface, as defined in the preamble or claim 1.

DESCRIPTION OF THE RELATED ART

V5 interface standards ETS 300 324 and ETS 300 347 describe an interface between a local exchange and an access network and the functionality in each network element. The access network is the part of a local area network that contains the subscriber's lines. Thus, subscribers and subscriber's lines can be connected to the exchange either directly (direct subscribers) or via various multiplexers and/or concentrators. V5 interfaces enable subscribers belonging to a physically separate access network to be connected to a local exchange using a standard interface.

A dynamic V5.2 concentrator interface as defined in the ETS 300 347 standard series consists of one or more (1–16) PCM (Pulse Code Modulation) lines. One PCM line comprises a total of 32 channels, each with a transfer rate of 64 kbit/s, i.e. 2048 kbit/s altogether. The V5.2 interface supports analogue telephones as used in the public telephone network, digital, such as ISDN (Integrated Services Digital Network) basic and system subscriber lines as well as other analogue or digital terminal equipment based on semi-fixed connections.

A static V5.1 multiplexer interface consistent with the ETS 300 324 standard series consists of one 2048 kbit/s PCM line. The V5.1 interface supports the same subscriber types as the V5.2 interface except ISDN system lines.

Terminal equipment can be connected to the subscriber ports of an access node. One access node may have one or more V5 interfaces connected to it. Subscriber ports are created in the V5.1 interface by associating an unambiguous address of each subscriber port with a given address in the V5.1 interface. In the local exchange, this address is created as a V5 subscriber. In other words, each subscriber port has an unambiguous address which is coupled with a V5.1 interface address and which uses a certain time slot (analogue subscribers) or certain time slots (ISDN subscribers) for communication with the local exchange. In the V5.2 interface, too, each subscriber port has an unambiguous address, but the signalling to the local exchange is implemented using a dynamically allocated time slot/dynamically allocated time slots. This means that the BCC (Bearer Channel Control) protocol as defined in the V5 standard allocates the time slots to be used separately for each call.

V5 standardisation aims at creating an open interface for use between a local exchange and an access network. However, no interface for use between the access node and the subscribers within the access network has been defined. Therefore, problems are encountered in connecting subscribers to the access node e.g. via a static concentrator interface (V5.1). A further problem is that, especially in an environment with multiple suppliers, the solutions of different suppliers for concentrating subscribers in an access network differ significantly from each other, which means that operators do not necessarily have enough choice options regarding suppliers of equipment.

A special problem associated with the cascading of V5 interfaces is that the network element transmitting messages does not necessarily have to implement all the states of the V5 interface port control status engine because, according to the standard, these states are in any case implemented in the local exchange and in the access node or concentrator closest to the subscriber. If the message transmitting network element were provided with status engines implementing all the states of the port control status engine, this would be likely to cause status conflicts between the local exchange, the message transmitting network element and the access node or concentrator closest to the subscriber.

SUMMARY OF THE INVENTION

The object of the present invention is to eliminate the drawbacks described above A specific object of the present invention is to disclose a new type of status engine for a message transmitting network element. The solution of the invention is designed to simplify the status engine so as to render it easier to encode and test than a standard status engine.

The telecommunication system of the invention for implementing ISDN user port status monitoring comprises a telephone exchange with a number of subscribers defined in it in the normal manner. The telecommunication system also comprises a first access node, which is connected to the telephone exchange via a first V5 interface, a second access node, which is connected to the first access node via a second V5 interface, and a subscriber terminal connected to the second access node. The connection between the subscriber and the telephone exchange, the access network, is formed by cascading the two V5 interfaces. In the method of the invention, the states of the user ports are monitored in different network elements using status engines appropriate for this purpose.

According to the invention, all ISDN user port activation messages are transmitted through the status engine of the first access node, which in this embodiment works as a message transmitting network element, without changing its status when the current status of the status engine is other than the BLOCKED state consistent with the specification.

As compared with prior art, the present invention has the advantage that, in the message transmitting network element, preferably the first access node mentioned above, it is possible to use the same status engine for PSTN and ISDN user ports. Moreover, the message transmitting network element need not take care of the various stages of the call after the user port has been set to the OPERATIONAL state. Therefore, the activation and deactivation messages transmitted in ISDN signalling need not be heeded.

In addition, the solution of the invention allows easier testing of the subscriber ports and the operation of a cascaded V5 interface. At the same time, the error potential is reduced, thus making the system more reliable.

In an embodiment of the invention, the ISDN user port status engine of the first access node is implemented using states consistent with the PSTN user port status engine. To implement this, the status engines monitoring the states of the ISDN user ports of the first access node are preferably identical with the status engines of PSTN user ports. Depending on the application, it is possible to implement in the first access node separate status engines for both PSTN and ISDN user ports or a common status engine for both port types because the status engines are substantially identical in respect of functionality.

The second access node is preferably a multiplexer or a concentrator. In addition, In an embodiment of the method, the first V5 interface is a V5.2 interface consistent with the ETS 300 347 standard series and the second V5 interface is a V5.1 interface consistent with the ETS 300 324 standard series.

BRIEF DESCRIPTION OF THE DRAWINGS

In the following, the invention will be described by the aid of a few examples of its embodiments by referring to the attached drawing, which represents a telecommunication system according to the invention.

DESCRIPTION OF THE PREFERRED EMBODIMENTS

The telecommunication system presented in the drawing comprises two local exchanges LE(1) and LE(2) and access nodes AN1(1), AN1(2) respectively connected to the local exchanges. In this example, the access nodes are connected to the local exchanges via V5.2 interfaces V5. As indicated by the figure, one access node can be connected to several local exchanges. Moreover, the system comprises a number of second access nodes AN2 or multiplexers, which are connected to a local exchange LE via access nodes AN1. The concentrator AN2 is connected to the first access node AN1 via a second V5 interface, which is a V5.1 interface V5'. Further, in the example presented in the drawing, the subscriber terminal equipment TE is connected to a local exchange via a second access node AN2 and a first access node AN1. The access network AN consists of the subscriber terminal equipment TE, the multiplexer AN2, the first access node AN1 and the lines connecting them.

The V5 interfaces presented in the telecommunication system depicted in the drawing are activated independently of each other. The interfaces are preferably activated in accordance with the normal V5 definitions. In the system illustrated by the drawing, it is also possible to implement a management network, which is connected to the local exchange LE, to the first access node AN1 and to the second access node AN2 to allow their operation to be monitored and controlled. However, the structure and function of the management network will not be described here in detail, but reference is made to the V5 standards.

As shown in the drawing, there are two V5 interfaces connected to the first access node, i.e. a first V5 interface V5 and a second V5 interface V'. When the first access node AN1 is initially started, the subscriber ports are in BLOCKED state. After the V5 interfaces have been started, the user ports are set into OPERATIONAL state. This action is identical for both ISDN and PSTN user ports. According to the standard, the ISDN status engine has separate states for each phase of a call. In the telecommunication system presented in the drawing, these states are implemented in the status engines of the second access node or concentrator AN2 and the local exchange LE, whereas in the first access node these states are not needed because messages are only transmitted through the first access node. If the V5 interfaces in the first access node AN1 remain in working order, then the user ports will be maintained in the OPERATIONAL state for the entire duration of the call. This corresponds to the operation of PSTN user port status engines.

In this example, the access node has separate status engines for both the first and the second V5 interfaces V5, V5', i.e. two status engines in all, because, within the access node, call signalling is transferred from one interface to the other. This makes it possible to avoid status conflicts during a call in the status engines of the first access node AN1. The operation of user port status engines is described in the ETS 300 324-1 standard, Annex L, items L.1.6.3.1, L.1.6.3.2, L.2.6.3.1 AND L.2.6.3.2. In the system presented in the drawing, the status engines implemented in the first access node practically correspond to PSTN status engines in respect of operation. In all other states except the BLOCKED state, the ISDN excitation signals (FE1010–FE106) are transmitted unaltered through the first access node. The status engine provided in the first access node AN1 for the second V5 interface V5' functions in the same way as the status engine defined for the local exchange (Annex L.2.6.3.2). The status engine provided in the first access node for the first V5 interface V5 functions in the manner defined for an access network status engine defined by the standard (Annex L.1.6.3.1).

To sum up, let it be further stated that the ISDN status engine in the first access node is identical to the PSTN status engine, which means that the ISDN status engine comprises four states: BLOCKED, LOCAL_UNBLOCK, REMOTE_UNBLOCK, and OPERATIONAL. All activation messages are transmitted through both status engines in the first access node without the state of the status engines being changed. Messages FE206–FE208 are transmitted in the same way.

The invention is not restricted to the examples of its embodiments described above, but many variations are possible within the scope of the inventive idea defined by the claims.

What is claimed is:

1. Method for implementing ISDN user port status monitoring in a telecommunication system comprising a telephone exchange (LE) with a number of subscribers defined in it, a first access node (AN1), which is connected to the telephone exchange via a first V5 interface (V5), a second access node (AN2), which is connected to the first access node (AN1) via a second V5 interface (V5'), and subscriber terminal equipment (TE) connected to the second access node (AN2), the connection between the subscriber and the telephone exchange (LE) being set up by cascading the two V5 interfaces, in which method the user port states are monitored in the various network elements (LE, AN1, AN2) using a status engine, characterised in that all ISDN user port activation messages are transmitted through the status engine of the first access node (AN1) without changing its state when the current state of the status engine is other than the BLOCKED state.

2. Method as defined in claim 1, characterised in that the ISDN user port status engine of the first access node (AN1) is implemented using states consistent with the PSTN user port status engine.

3. Method as defined in claim 1, characterised in that, in the first access node (AN1), separate status engines are implemented for the ISDN user ports of the first V5 interface (V5) and for those of the second V5 interface (V5').

4. Method as defined in claim 1, characterised in that, in the first access node (AN1), the same status engine is used for PSTN and ISDN user ports.

5. Telecommunication system for implementing ISDN user port status monitoring, said telecommunication system comprising a telephone exchange (LE) with a number of subscribers defined in it, a first access node (AN1), which is connected to the telephone exchange via a first V5 interface (V5), a second access node (AN2), which is connected to the first access node (AN1) via a second V5 interface (V5'), and subscriber terminal equipment (TE) connected to the second access node (AN2), the connection between the subscriber and the telephone exchange (LE) being set up by cascading the two V5 interfaces, in which system the local exchange, the first access node and the second access node comprise status engines for monitoring the ISDN user port states, characterised in that the status engine of the first access node (AN1) is designed to transmit ISDN user port activation messages without changing its state when the current state of the status engine is other than the BLOCKED state.

6. System as defined in claim 5, characterised in that the ISDN user port status engine in the first access node (AN1) has been implemented using states consistent with the PSTN user port status engine.

7. System as defined in claim 5, characterised in that the first access node comprises a status engine for the ISDN user ports of the first V5 interface (V5) and of the second V5 interface (V5').

8. System as defined in claim 5, characterised in that the second access node (AN2) is a multiplexer or a concentrator.

9. System as defined in claim 5, characterised in that the first V5 interface (V5) is a V5.2 interface consistent with the ETS 300 347 standard and the second V5 interface (V5') is a V5.1 interface consistent with the ETS 300 324 standard.

* * * * *